July 25, 1933.  W. L. RUTKOWSKI  1,920,131
POURING SPOUT FOR SALT AND LIKE CONTAINERS
Filed Oct. 1, 1931

INVENTOR:
W. L. Rutkowski
BY
ATTORNEY.

Patented July 25, 1933

1,920,131

UNITED STATES PATENT OFFICE

WALTER L. RUTKOWSKI, OF ST. LOUIS, MISSOURI, ASSIGNOR TO R. C. CAN COMPANY, OF ST. LOUIS, MISSOURI, A CORPORATION OF MISSOURI

POURING SPOUT FOR SALT AND LIKE CONTAINERS

Application filed October 1, 1931. Serial No. 566,351.

My invention relates to a pouring spout for dispensing containers, such as used for salt and other substances and has for its object to provide a pouring spout that can be readily attached to the container from the outside thereof, either after the container has been filled with contents through an opening therein or before container has been filled with contents.

A further object of the invention is to provide each side wall of the spout with a right angular shoulder adjacent one end of the central portion of the spout.

A further object of the invention is to provide one edge of each of the side walls of the spout at each end thereof with a laterally directed flange to limit outward arcuate or swinging movement of the spout when applied to a container.

A still further object of the invention is the provision of a pouring spout for salt and like containers which possesses advantages in points of simplicity and efficiency, and, at the same time proves itself comparatively inexpensive in cost of manufacture.

With the above and other objects in view, the invention consists in the novel features of construction, arrangement and combination of parts hereinafter more fully described and finally pointed out in the claims hereto appended.

Referring to the accompanying drawing in which like characters of reference denote similar parts throughout the several views.

Figure 1:
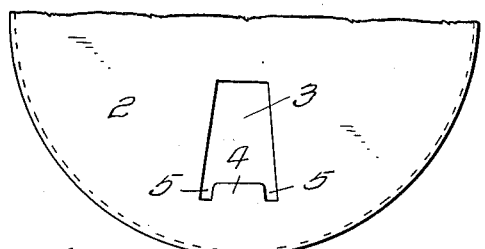
Fig. 1 is a fragmentary view of a container cover showing the outline of one shape of the filling and pouring opening therefor.

Referring to the drawing, the reference numeral 1 designates a container made from cardboard, laminated paper, sheet metal or any other suitable material for containing any substance which can be poured, preferably, although not necessarily dry substances.

The numeral 2 designates a cover for the container which is made from cardboard, metal or any other relatively stiff material suitable for a cover. The cover is provided at a suitable location with an opening 3 which is to be used for filling the container with contents and also as a pouring or outlet opening. The opening may be tapered in shape, as shown in Fig. 1, or it may be a rectangular opening 3' as shown in Fig. 10.

Figures 10, 11:
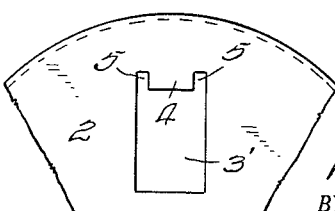
Fig. 10 shows a modified form of filling and pouring opening in the cover.
Fig. 11 shows a plan view of the spout blank adapted to fit the modified form of cover opening.

The outer edge of the cover opening is provided with a centrally located tongue 4 which is integral with the cover and directed into the cover opening, as shown in Figs. 1 and 10. The tongue 4 is of less width than the cover opening, thus providing two corner recesses 5.

Figure 5:
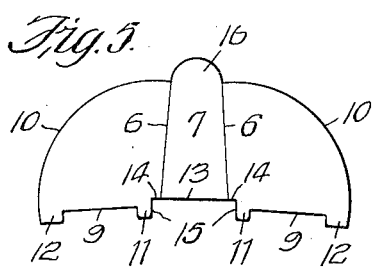
Fig. 5 is a plan view of the blank from which the spout is formed.

The pouring spout is preferably, although not necessarily, made from a blank of sheet metal or other suitable material and has the general outlines, as clearly shown in Fig. 5.

The spout blank shown in Fig. 5, is adapted to be bent on the light lines designated 6 which are converging when the spout is to be fitted to a tapered cover opening 3, as shown in Fig. 1, and is bent on the parallel lines designated 6', as shown in Fig. 11, when the spout is to be fitted to a rectangular cover opening, as shown in Fig. 10.

When the spout blank is bent or formed into substantially U-shaped formation, the spout comprises a central body or floor portion 7 and two like side wall portions 8.

Figure 2:
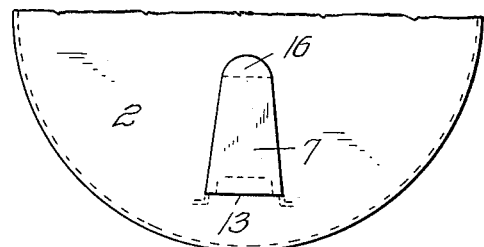
Fig. 2 is a fragmentary view of a container cover showing my spout applied thereto and in closed position.
Figure 3:
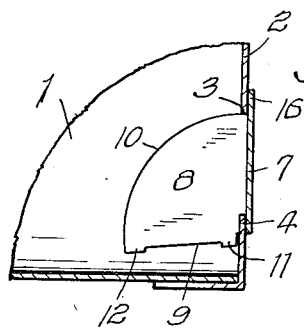
Fig. 3 is a view taken on line 3—3 of Fig. 2.
Figure 4:
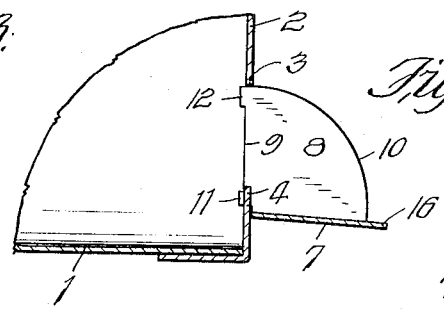
Fig. 4 is a view similar to Fig. 3 showing the spout in open position.

The floor portion 7 of the spout, as is manifest, corresponds in shape to the cover opening and together with the thickness of the side walls 8 is adapted to close the filling and pouring opening of the cover when the spout is applied to the cover and in its closed position, as shown in Fig. 2.

Each side wall of the spout is provided with a straight edge 9 and a curved edge 10, the latter adapted to engage the inner end edge of the cover opening for preventing longitudinal displacement of the spout within the cover opening as will be apparent hereinafter.

Figure 6:
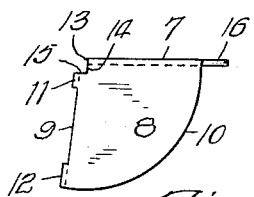
Fig. 6 is a side elevation of the spout.
Figure 7:
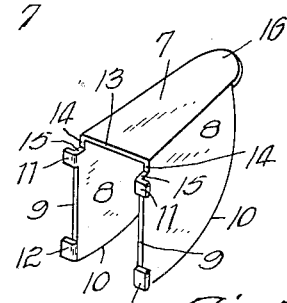
Fig. 7 is a perspective view of the spout.

Each straight edge 9 of the side walls 8 of the spout is provided with a pair of stops designated 11 and 12. Stops 11 are located at the upper ends of the straight edges 9 of the side walls 8 adjacent the outer end edge 13 of the floor portion 7, which edge 13 is located the thickness of the cover material back from the straight edge 9 of the side walls 8. This set back edge 13 extends slightly into the side walls 8 at the upper rear corners of the spout and are designated 14 in Fig. 6, and join with the upper side edges 15 of the stops 11 to form right angular corner shoulders for the spout which shoulders are adapted to engage the outer end edges of the cover opening which edges form the bases of the corner recesses 5 of the cover opening and act as hinge lines for the cover to swing upon. The curved edges of the side walls keep the right angular corner shoulders of the side walls in contact with the outer recess edges thereby preventing longitudinal displacement of the spout within the opening, both when the spout is in closed position and during swinging or hinged movement of the spout during outward or inward movement thereof relative to the cover opening.

The stops 11 and 12 of the side walls 8 are bent outwardly at a right angle to the side faces of the side walls to limit the outward swinging movement of the spout.

The inner end portion of the central body or floor portion 7 of the spout extends beyond the curved edges of the side walls 8 and act as a stop 16 limiting the closing movement of the inner end of the spout and also serves as a finger grip for imparting outward swinging movement to the spout.

The cover tongue 4 serves as a stop for limiting the closing movement of the outer end of the spout and together with the finger grip extension of the central or floor portion of the spout prevents the floor portion of the spout from being forced below the upper plane of the cover and into or through the cover opening.

The stops 11 and 12 of each side wall 8 are spaced apart to provide a gap between them in order to allow the spout to be applied to the cover opening from the outside and removed from the cover when so desired.

Figure 8:
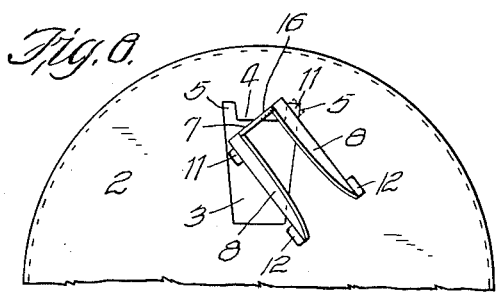
Fig. 8 is a plan view showing the initial position of the spout relative to the cover opening when applying the spout to the cover.
Figure 9:
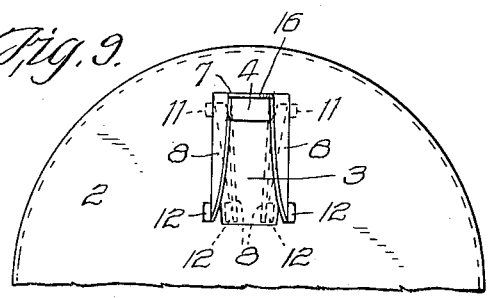
Fig. 9 is a view similar to Fig. 8 showing the spout swung into its second position of applying it to the spout, the dotted lines showing the side walls thereof pressed toward each other.

To apply the spout to the cover opening, it is first positioned above the opening upon the outside of the cover, as shown in Fig. 8 so that one of the stops 11 will have been passed through the cover opening and into engagement with the upper face of the cover adjacent one of the corner recesses and with one of the right angular corner edges of one of the side walls in contact with the rear edge of the corner recess and its other edge in contact with the outer face of the cover. The spout is then swung into normal position with the cover opening so that the stop 11 of the other side wall 8 will engage the lower face of the other corner recess of the cover and one of the edges of the other right angular shoulder will contact with the rear edge of the other cover recess. When and as this occurs, the operator presses the free edge portions of the side walls toward each other, as shown in dotted lines in Fig. 9, so as to allow the stops 12 of the side walls 8 to clear the side edges of the cover opening and then the spout is swung into closed position by pressing down on the inner end of the central or floor portion of the spout. The stops 11 of side walls having once passed through the cover opening, side pressure is released upon the side walls and they readily expand outwardly to normal position due to their resiliency.

The spout having been thus applied from the outside and closed, it can be readily opened for pouring purposes by merely lifting upon the extension grip end of the central or floor portion of the spout.

The spout can be moved from the cover, if desired, for any reason, by merely swinging the spout to open or pouring position, then gripping the side walls and pressing them toward each other so as to free the stops from contact with the side edges of the cover opening, then pulling the stops 12 through the cover opening and finally giving the spout a partial turn to either side for relieving one of the stops 11 from contact with the underface of the cover and clearing it of its respective side edge of the cover opening when, then, the spout can be readily lifted from connection with the cover and away from the cover opening.

The many advantages of the herein described invention will readily suggest themselves to those skilled in the art to which it appertains.

From the foregoing description, it is evident that a simple device for this purpose has been disclosed, but it is to be understood that I do not desire to restrict or limit myself to the very details of the construction shown and described, which is merely illustrative, it being obvious that changes, not involving the exercise of invention, may be made without conflicting or departing from the spirit of the invention within the scope of the appended claims.

What I claim is:

1. The combination of a container having a cover provided with a rectangular opening, a lip integral with the cover and narrower than the width of the cover opening to provide a pair of corner recesses communicating with the cover opening, a winged spout having a flat floor and the wings thereof provided with right angular hinge forming corners at the junction of the wings of the spout with the floor of the spout and one edge of each spout wing having each end thereof provided with a stop disposed at a right angle to the side faces of the wings and directed outwardly from the outer face of each side wall, one face of each hinge corner of the spout adapted to engage the end edge of the corner recesses when the spout is closed and the other face of each hinge corner of the spout adapted to engage the inner edge of the corner recesses when the spout is in its closed position.

2. In a container having a closure provided with an opening with a tongue directed thereinto from one end thereof and separated from the side edges of the opening by opposed corner recesses, a winged spout having a flat floor hinged in said opening, the wings of said spout each having a straight edge disposed in diverged relation to the rear straight edge of the floor of the spout, a pair of stops formed in spaced relation on the diverged edges of the wings and there being a vertically disposed right angular shoulder formed on each wing adjacent the rear edge of the floor of the spout, one surface of said shoulders serving to engage the end edges of the corner recesses when the spout is closed and the other surfaces of said shoulders serving to engage the end edges of the corner recesses when the spout is in its opened position.

WALTER L. RUTKOWSKI.